Figure 1:
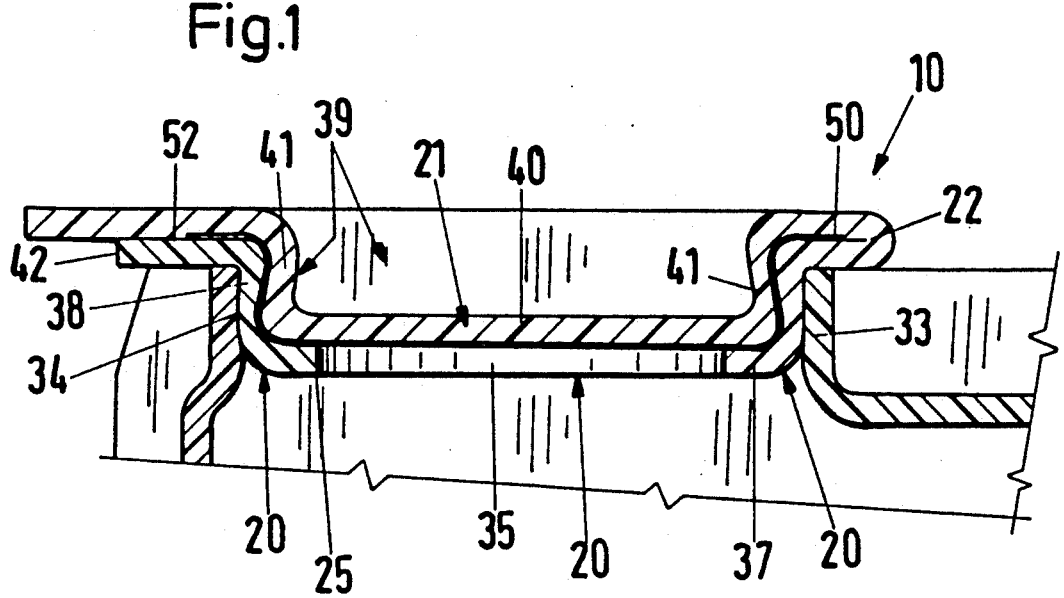

United States Patent [19]

Reil et al.

[11] Patent Number: 5,287,983
[45] Date of Patent: Feb. 22, 1994

[54] POURER DEVICE FOR A FLOWABLE MEDIA PACKAGE AND A METHOD OF PRODUCING SUCH A DEVICE

[75] Inventors: Wilhelm Reil, Bensheim; Gerd Knobloch, Griesheim; Gottfried Pusch, Pfungstadt, all of Fed. Rep. of Germany

[73] Assignee: Tetra Laval Holdings & Finance S.A., Pully, Switzerland

[21] Appl. No.: 845,024

[22] Filed: Mar. 3, 1992

[30] Foreign Application Priority Data

Mar. 9, 1991 [DE] Fed. Rep. of Germany ....... 4107607

[51] Int. Cl.⁵ ............................................. B65D 51/22
[52] U.S. Cl. ..................................... 220/258; 220/259; 215/232; 215/237; 229/125.09; 229/125.14
[58] Field of Search ................... 215/232, 235, 237; 220/256, 258, 259, 359; 229/125.09, 125.14

[56] References Cited

U.S. PATENT DOCUMENTS

| | | |
|---|---|---|
| 1,344,516 | 6/1920 | Phillips . |
| 2,625,306 | 1/1953 | Murphy . |
| 2,885,084 | 5/1959 | Rocca ................. 229/125.09 X |
| 3,018,024 | 1/1962 | Foord ................. 229/125.09 X |
| 3,167,210 | 1/1965 | Carney . |
| 4,399,924 | 8/1983 | Nilsson .................. 220/257 |
| 4,782,996 | 11/1988 | Spahni . |
| 4,807,787 | 2/1989 | Langmeier . |
| 4,892,217 | 1/1990 | Shastal . |
| 4,986,465 | 1/1991 | Jacobsson et al. ........... 229/125.3 |

FOREIGN PATENT DOCUMENTS

| | | |
|---|---|---|
| 0318606 | 6/1987 | European Pat. Off. . |
| 8617267 | 12/1987 | Fed. Rep. of Germany . |
| 3924138 | 1/1991 | Fed. Rep. of Germany . |
| 1127590 | 12/1956 | France . |
| 2538784 | 7/1984 | France . |
| 2565942 | 12/1985 | France . |
| 1436969 | 5/1976 | United Kingdom . |
| 2180228 | 3/1987 | United Kingdom . |

*Primary Examiner*—Allan N. Shoap
*Assistant Examiner*—Nova Stucker
*Attorney, Agent, or Firm*—Burns, Doane, Swecker & Mathis

[57] ABSTRACT

A pourer device of synthetic plastic material for attachment to a hole in a package for flowable contents includes a bottom part and a closure part that are connected to one another by a hinge. At least one of the bottom part and the closure part is movable between an open position and a closed position. A pourer orifice is formed in the bottom part and a synthetic plastic film is provided between the closure part and the bottom part, over the orifice. A method for producing such a pourer device is also described.

16 Claims, 6 Drawing Sheets

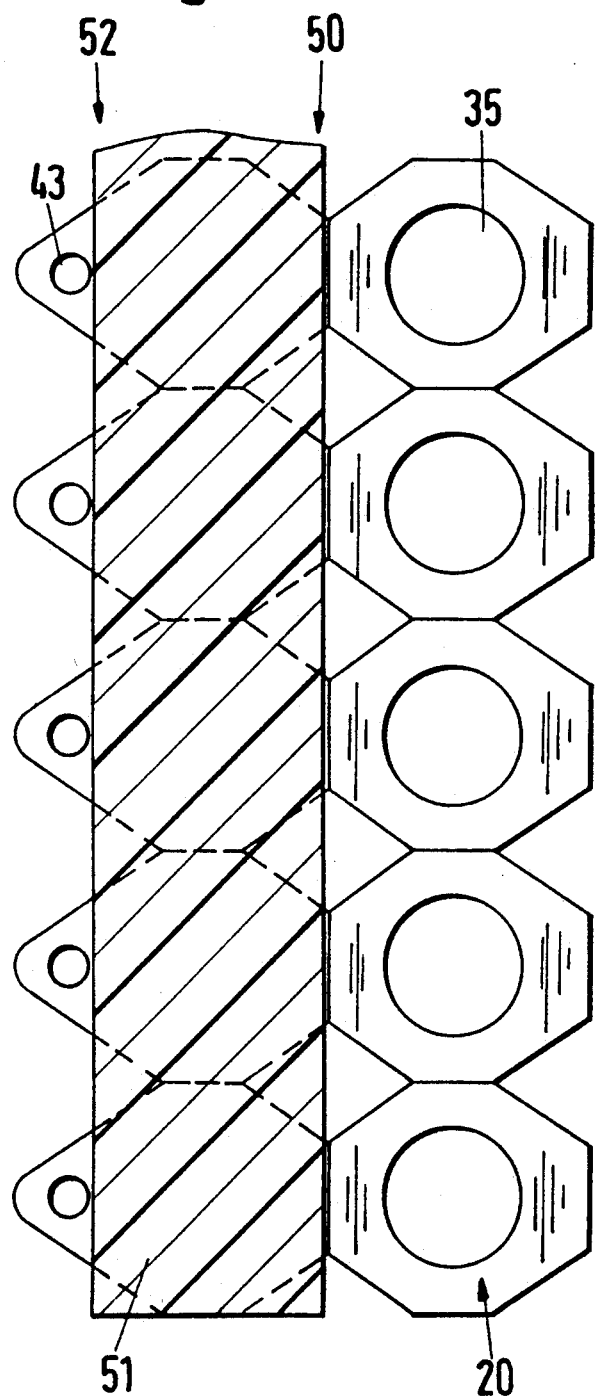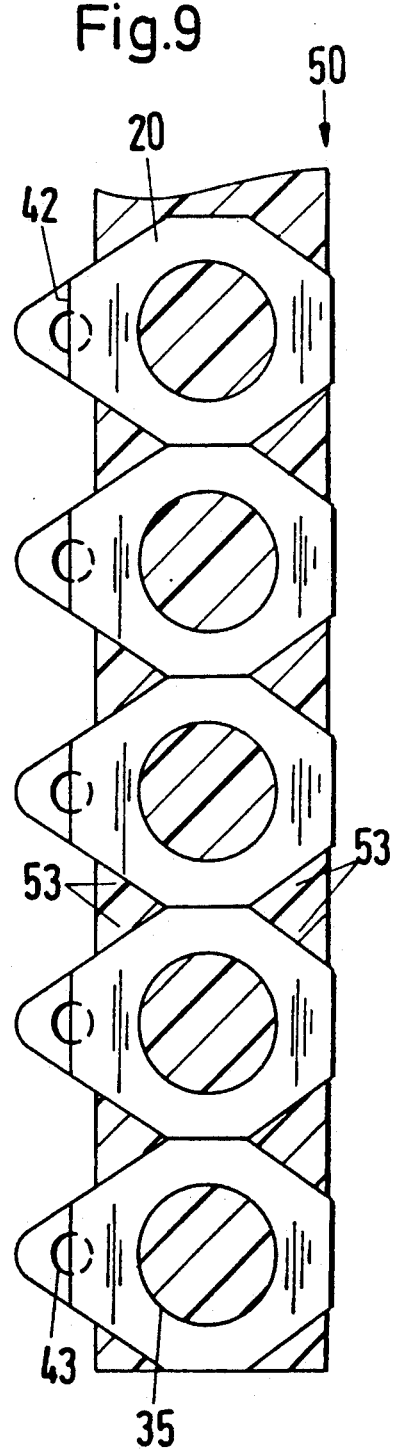

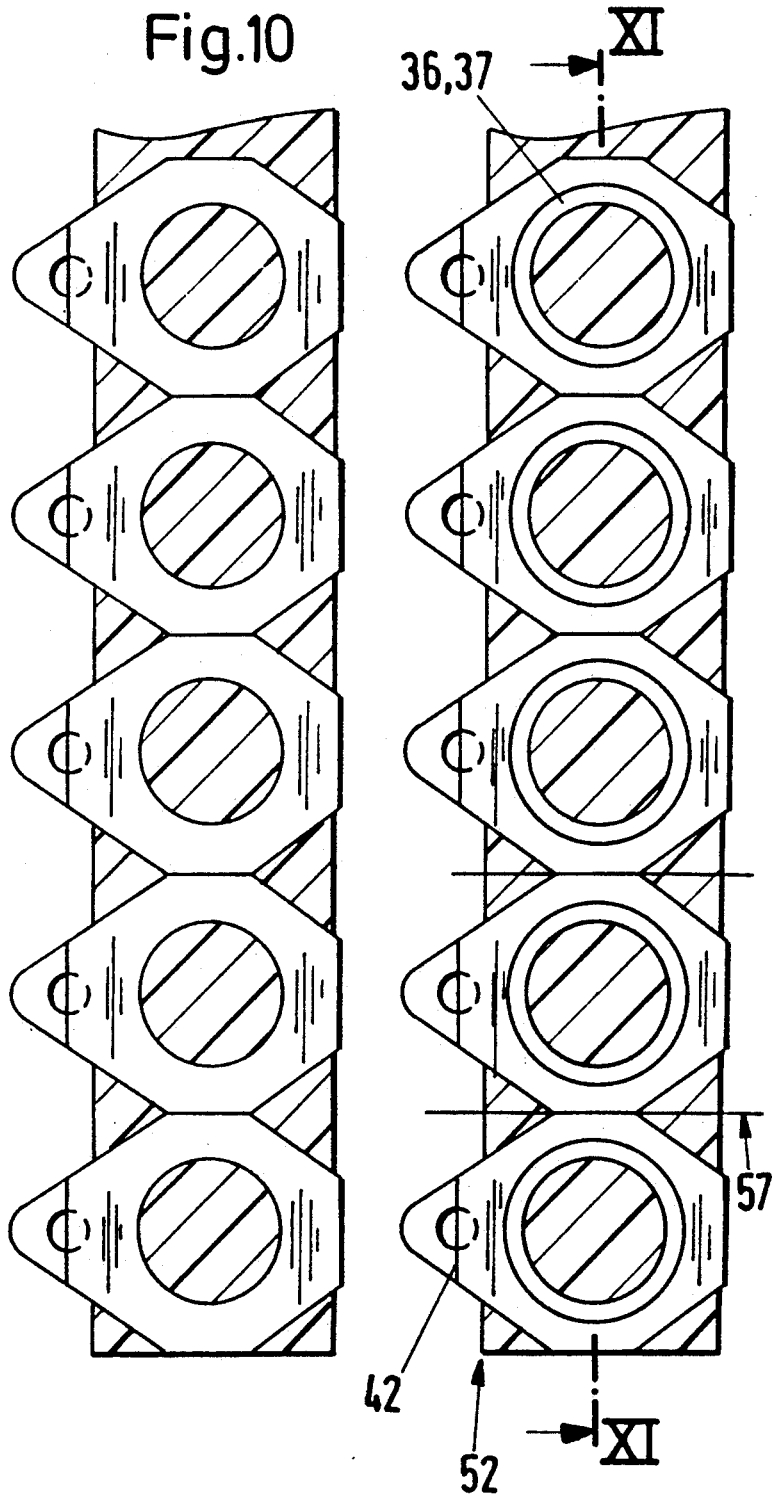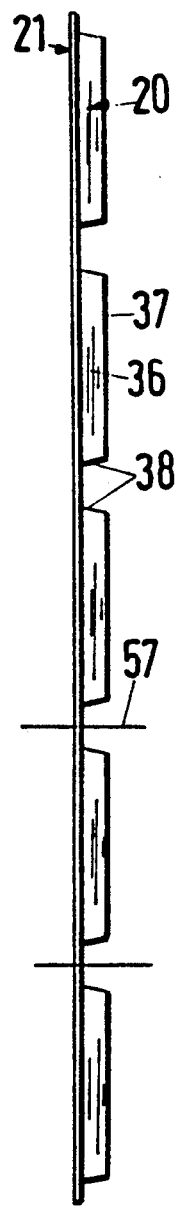

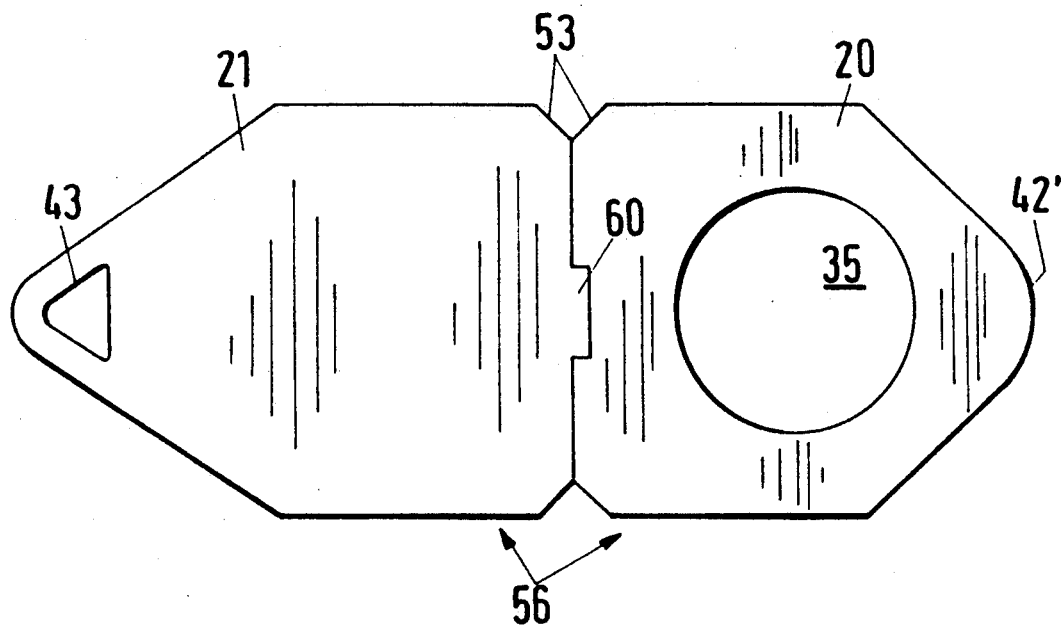
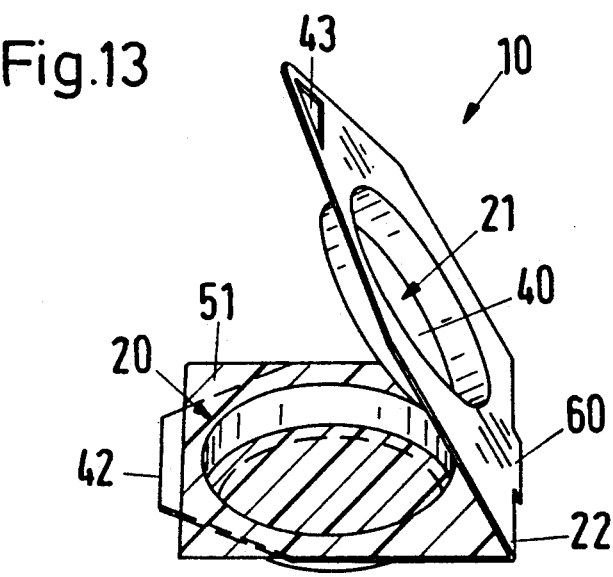

POURER DEVICE FOR A FLOWABLE MEDIA PACKAGE AND A METHOD OF PRODUCING SUCH A DEVICE

The invention relates to a pourer device consisting of synthetic plastics material and for attachment to a hole in a package intended to contain flowable contents and also to a method of producing such a pourer device.

It is indeed possible to pour contents out through the hole in a package which is generally disposed in the top end thereof, without having any accessory devices. Within the meaning of the present invention, however, a particularly constructed part consisting of synthetic plastics material is generally termed the pourer device because the emptying of a package of flowable contents can only be performed expediently, e.g. with a clearly defined poured stream, when such a pourer device is used.

Many packages have a pourer device and packages are also known which consist of synthetic plastics coated paper and into the top wall of which there is stamped a hole which is closed by a separate pourer device. It is possible to open the pourer devices by strips which can be torn upwardly, in which case closed walls are frequently torn open, whether they are weakened by lines of perforations or they expose a pourer orifice extending lengthwise of a welded seam.

If one has a package with a hole around which there is a raised collar, then the package can be sealed by a similar pourer device to that referred to at the outset. Attempts have already been made to provide a pourer device consisting of a bottom part and a closure part connected thereto by a hinge, but in the bottom part of which there is a tear line. Along with many advantages of such a prefabricated pourer device which is stored and then fitted on the hole of the package, opportunities for improvement have been envisaged in order for example to store a relatively large number of prefabricated parts on a roll so that the machine running time can be lengthened, the time required to attach the pourer device to the whole of the package reduced and the attachment process simplified while in all cases the end user finds opening simple and easy.

Therefore, the invention is based on the problem of providing a pourer device of the type mentioned at the outset, by means of which a hole in variously constructed packages can be readily closed in order for example to guarantee storage and transport of the fluids package with no risk of leakage while on the other hand making it easily opened by the user, preferably also with markings to assist opening. Another object is to provide a method of producing such a pourer device which can be produced reliably and economically in large quantities per unit of time.

A pourer device with which the aforesaid problem can be resolved is according to the invention characterised in that the pourer device has a bottom part and a closure part which are articulatingly connected to each other for movement via a hinge and in that a pourer orifice is provided in the bottom part. A flowable medium package which can be sealed in this way only requires a hole in its top wall without any additional measures having to be provided for closure, opening and re-closure. Thus, the manufacturer of the packages for flowable media and which are to be closed, has considerable freedom in the design of the packages. The pourer device according to the invention can be prefabricated and stored alongside a package-producing machine so that in each case prior to or preferably after filling, the package can be closed by means of such a pourer device and yet still be expediently usable by the consumer. The very easily constructed pourer device consists of two parts connected to each other by a hinge, the bottom part being fitted directly on the hole in the package and itself already comprising a stamped out pourer orifice.

It is particularly expedient if the pourer device consists entirely of a synthetic plastics material, at least the bottom part and the closure part being weldable. For these parts of the pourer device, preferably a deep drawable synthetic plastics material, e.g. a thermoplastics material, such as polypropene is used. Also PVC can serve as such a synthetic plastics material, polypropene being widely known in the industry as polypropylene. The pourer device according to the invention and in this respect at least the bottom and closure parts, consists of perfectly recyclable and easily degradable parts and materials, compared with many known pourer devices which consist of composite materials of for example paper and synthetic plastics material. Where such a preferred embodiment is concerned, the synthetic plastics material, e.g. the polypropene, can also be filled the fillers here being chalk, mica, talcum, gypsum or the like. In practice, degrees of filling of up to 70% and preferably 60% have been found favourable. It has been demonstrated that synthetic plastics materials filled in this way are on the one hand easily degradable but naturally they can also be reprocessed or recycled by simple methods and with ease without adversely affecting the properties of a synthetic plastics material so that such filled plastics materials are in particular deep drawable and also sealable.

The new pourer device according to the invention is flat when it is still an intermediate product because only a stamped-out bottom part into which the pourer orifice is made by this stamping process, and a closure part, both of which are in themselves flat, are folded one onto the other along the hinge line and have outstanding stacking properties. They can be stored in large numbers, for example in rows on rolls as an endless strip. Thus, the running time of a package producing machine can be quite considerable. In other words, packages with the new pourer device can be closed one after another in large quantities until the stock of stored pourer devices is exhausted and has to be replaced by a fresh stock.

In comparison with the earlier consideration of a similar pourer device with a tear-open line in the bottom part, the convenience of opening the pourer device according to the invention is improved in that the pourer orifice is already provided as a stamped out orifice in the bottom part and is only closed by the closure part so that the process of opening only requires the closure part to be raised about the hinge so exposing the pourer orifice. A very comfortable opening process in turn also avoids liquid splashing unintentionally so that for the end user opening is made more agreeable and expedient.

As a further development of a preferred embodiment, it is according to the invention envisaged that the bottom part and the closure part respectively comprise a beaker-shaped depression with a bottom and a shoulder rising from the edge thereof and in that the beaker-shaped depression in the closure part can be moved into the beaker-shaped depression in the bottom part to mask the pourer orifice. The shoulder is virtually the cylindrical side wall of the cup or beaker and the bottom of the depression is the bottom of the cup. This design of cup-like or beaker-like depression is preferably obtained by deep drawing after the flat bottom and closure parts have been taken off, preferably only upon insertion into the packaging machine but particularly preferably after the package has been filled and before the pourer device is fitted to the hole. As a result of the depression in the closure part, the manufacturer of the pourer device has an opportunity of fixing it to the edge of the hole in the package which preferably has a corresponding cylindrical ring. Such fixing is a simple connection of synthetic plastics parts which can be connected to each other by sealing, welding or gluing. The beaker-shaped depression also advantageously determines the space so that in the region of the shoulder tools can be applied in order to press the walls against each other. Fixing the pourer device according to the invention into the hole of a package to contain liquids can however also be accomplished via other surfaces of the bottom part, namely the generally flat main surface of the bottom part which surrounds the cup-shaped depression and which rests on the edge of the hole in the package.

According to the invention, the pourer device is already stamped into the bottom part and pushing in the beaker-shaped depression in the closure part results in this pourer device being completely closed. Therefore, between the outer surface of the beaker-shaped depression in the closure part and the inner oppositely disposed surface of the beaker-shaped depression in the bottom part, there should only be a minimal clearance so that a certain clamping effect is produced. If necessary, this can also be enhanced if there is provided on the bottom outer end of the shoulder on the closure part an outwardly directed bead which fits with a snap action behind a more or less softly formed edge on the inner surface of the shoulder on the bottom part. The shoulder on the beaker-shaped depression of the bottom part could accordingly have an outwardly directed bead so that, viewed from the inside, there is a widening out into which the bead on the shoulder of the beaker-shaped depression in the closure part can be fitted. Thus, there is even a certain snap action, interlocking action or at least a rigid clamping, to a certain extent even a positive connection between the closure part and the bottom part. Thus, for the pourer device according to the invention there is obviously a guarantee of satisfactory closure for transportation of the package.

According to the invention, it is furthermore expedient to provide between the bottom part and the closure part a synthetic plastics film which masks the pourer orifice and its edge and which projects beyond at least the bottom part at one point. Even with a loosely inserted synthetic plastics film, it is evident that sealing-tightness is improved upon closure, so that also fluids packages can be closed in sealing-tight fashion in this way to prevent the liquid contents splashing out unintentionally.

Furthermore, it is according to the invention particularly expedient if the synthetic plastics film is sealed around the pourer orifice on the bottom part in sealing-tight fashion and with minimal force of adhesion. If the pourer device is in fact deep drawn prior to being applied to the hole in the package which is to be closed, then the synthetic plastics film inserted between the bottom part and the closure part can be shaped directly during the deep drawing process without any special or additional operation so that the film is disposed on the inner surface of the cup-like depression in the bottom part. This provides two particular advantages. One resides in the bacteriological sealing-tightness of the package even after it has been opened mechanically, i.e. after the closure part has been raised, because if the synthetic plastics film is only sealed to the bottom part, it does not move together with the closure part when this latter is folded upwards but remains clinging in sealing-tight fashion to the cup-like depression in the bottom part so that the pourer device is still completely closed.

The second advantage lies in the fact that even after the closure part has been lifted up, the user can see that the package has not yet been opened. Consequently, the manufacturer of the pourer device or also of the entire fluids package is able to use such a device which has a synthetic plastics film to serve as an opening mark. In the English language literature, it could be said that the pourer device is therefore tamper-resistant. Any inadmissible manipulation of the package becomes directly obvious from the aforesaid mark.

Of course, the convenience of opening would suffer if the synthetic plastics film could not be easily detached from the cup-shaped depression in the bottom part. Therefore, the synthetic plastics film is sealed to the bottom part with only minimal adhesive force. This must be understood to mean a peelable fixing which in English language literature is termed "capable of being peeled off". Therefore, where the attachment of the synthetic plastics film to the bottom part is concerned, this does not by any means relate to a bonding of materials nor to an actual welding process but more to a process of adhesion with the result that the synthetic plastics film can easily be removed and the pourer orifice opened without the end user having to apply any great force.

According to the invention, it is furthermore advantageous if both beaker-like depressions in the bottom part and closure part have almost the same outside diameter and if they with an interposed synthetic plastics film extending between the raised shoulders can be fitted one into the other by a clamping and/or snap action effect. Hereinabove, the pourer device is explained without the interposed synthetic plastics film and the clamping closure of the two beaker-shaped depressions into each other is also explained. Insertion of the synthetic plastics film advantageously does not in any way affect the closure properties of the pourer device. The synthetic plastics film is thus of thin construction so that during the deep drawing process it follows the expansion process and readily applies itself even over the slightly outwardly protruding bead on the outside of the cup-shaped depression in the closure part while nevertheless fitting over the edge of the pourer orifice and preferably the shoulder on the beaker-like depression in the bottom part, extending upwardly and outwardly over this.

The difference, i.e. the differential or the gap between the outer surface of the beaker-like depression in the closure part and the inner surface of the beaker-like depression in the bottom part ought indeed to have a very slight clearance for insertion of the synthetic plastics film, because the synthetic plastics film has to be of very thin construction in order to attain the above-described properties, so that pressing down the closure part after opening with a clamping effect is possible in the same way as mentioned above when describing the pourer device without the inserted synthetic plastics film. The inserted film should also be so thin in construction that after removal of the film, i.e. after complete opening of the pourer device, it is still possible to press down the closure part so that it fits with a snap action into the bottom part again to re-close the pourer device. Therefore, the man skilled in the art will construct the synthetic plastics film from suitable materials and to such thin dimensions that the film becomes adequately stretchable for the deep drawing process so that it is not destroyed during the deep drawing process.

It is furthermore expedient according to the invention if a gripper device is provided at a location on the closure part, preferably diametrically opposite the hinge. This gripper device can preferably be constructed as an extension of the upper surface of the closure part, as a rounded point with a hole stamped in it. The gripper device on the closure part therefore projects beyond the pouring edge of the bottom part by about 3 to 10 mm in the opposite direction to the hinge so that when the pourer device is in the closed state, the closure part has the gripper device protruding somewhat, e.g. the aforementioned 5 mm, beyond the pourer edge. For the end user when opening, in order to improve friction and adhesive force, so that when opening the package for the first time and taking hold of the gripper device this latter does not slip between the fingers, it is a good idea for the gripper device to consist of this forwardly extended tongue into which the hole is stamped. This hole can be for example circular, in other words constitute a circular hold; but it can also be triangular if the point is directed away from the hinge and forwards to the outermost edge of the gripper device.

The closure part and/or possibly also the bottom part are preferably produced from one web, one sheet or one film having a thickness of 0.1 to 1.5 mm and preferably 0.5 to 1 mm. The pourer device with the aforementioned gripper device can be of very flat construction, i.e. of minimum-height so that a package provided with the pourer device according to the invention still remains readily stackable.

It is preferred for the front tapered end of the closure part, where the gripper part is disposed, to be so constructed i.e. for the gripper device to be so disposed in relation to the outer edge, that the pourer edge of the bottom part is always masked when the pourer device is closed.

Furthermore, it is according to the invention advantageous if virtually all the outer surfaces of the bottom part, in the closed condition of the pourer device, are masked by the closure part when this latter is folded down. Where the surfaces of the bottom part are concerned, these are surfaces which can come in contact with the contents and on which, at least to a certain extent, contents may remain after partial emptying of the package containing the flowable medium, with the result that from this point impurities can collect or for example in the case of milk constituting the contents, bacteria may form. Dust and other dirt particles endanger particularly those surfaces which come in contact with contents. If such surfaces are correctly masked, as envisaged within the invention, then the hygiene of such a package can be substantially improved.

According to the invention, it is furthermore advantageous if the synthetic plastics film be so constructed from at least two layers that the surface of the synthetic plastics film which is opposite the closure part is substantially not capable of being sealed and/or glued to the closure part. It is possible to provide synthetic plastic materials for the inserted film which can be welded to the synthetic plastics material of bottom part and closure part and which is however so coated on one surface with an applied sealing-impairing agent that the effect of the heat during deep drawing does not result in the synthetic plastics film becoming bonded together with the closure part nor even being stuck to it; instead, it is connected to the bottom part in such a way that it can be peeled off. Thus are provided the desired advantages of an easy mechanical opening of the closure part even though the pourer device in the bottom part subsequently remains still completely bacteriologically sealed by the synthetic plastics film. By sealing the synthetic plastics film to the bottom part with minimal adhesive force, i.e. with the properties of peelability, the end user is then able to remove the synthetic plastics film by peeling it off the pourer orifice, so opening the latter.

As an example of a material for the film which must match the type of material used for the closure part and for the bottom part, it is possible if polypropylene is used for the bottom part and closure part to use a film material consisting of polyester because polyester does not become bonded to polypropylene or polypropene during deep drawing. To achieve the sealing to the bottom part or peelable adhesion of the film to the bottom part, the surface of the synthetic plastics film opposite the bottom part is coated with polyethylene. This coating ensures the peelable connection between synthetic plastics film and bottom part by the action of the heat resulting from the deep drawing process.

For the manufacturer of the previously described pourer device, there is particularly one process which is of interest and which by simple measures and with the application of but small quantities of materials, is capable of providing a pourer device which is suitable for fitment in a hole in a package for flowable contents. For the suitable development of such a manufacturing process it is according to the invention envisaged from a sheet or an endless web of deep-drawable synthetic plastics material, a series of serially disposed blanks which contact one another in punctiform and/or linear fashion can be stamping be formed in the shape of a bottom part with a pourer orifice and a closure part, these parts being connected to each other by a web, and in that the said series of blanks are folded over along the webs and are placed on one another and, prior to subsequent singling out are rolled up into a coil to constitute a portable intermediate product.

In the manner already indicated above, the blanks are advantageously in a flat state when they are the portable intermediate product. Therefore, they can be very space-savingly wound up into a roll. Furthermore, the manufacture of such blanks is very simple because it is only necessary for them to be fed to a stamping apparatus and then to a folding apparatus. The blanks are advantageously first singled out only when they are fed to a package producing machine by means of which the pourer devices are individually mounted on the packages, one after another. Prior to that stage, the blanks even though they have been pre-treated, remain in rod form, i.e. a row, possibly even a very long row of some hundreds of blanks or pourer devices, can always be handled.

In this respect, it is particularly preferred if according to the invention, following the stamping out and prior to the folding over a synthetic plastics film in strip form is laid loosely over the bottom parts of the row of blanks. Manufacture of the synthetic plastics film which is preferably coated on one side with a suitable material is simple and is known per se to a man skilled in the art. For the production process according to the invention, is particularly favourable thereby if the synthetic plastics film is drawn from a stock roll or the like in strip form or web form of suitable width and is so placed over the bottom parts of the row of blanks that afterwards the closure parts can be folded over and placed flat on the bottom parts. When this happens, the synthetic plastics film extends from the folded edge, i.e. the hinge of the folded-over blank, and covers the entire width within which also the pourer orifice is disposed and as far as the opposite side.

Until the portable intermediate product, i.e. the folded-over closure and bottom parts—preferably with the synthetic plastics film inserted—is obtained, therefore, no deep drawing or welding process is performed and the stamped-out surfaces constitute material parts which can be immediately recycled following the stamping process.

According to the invention, it is furthermore envisaged that the folded-over blanks should be subjected to a deep drawing process in which bottom part and closure part are jointly deep drawn to form the beaker-shaped depressions, after which they are singled out and then applied to the hole in the package. Thus, in an advantageous way a cover which would occupy a certain volume or the pourer device which can to a certain extent be described as bulky need only be prepared briefly before being fitted into the package or shortly before attachment to the hole in the package holding the fluid medium. The resulting advantages of a space-saving storage of the intermediate product in rod form have already been mentioned.

By virtue of the fact that the synthetic plastics film, preferably a polyester film, is during the deep drawing process chemically stable vis-a-vis the synthetic plastics materials of bottom part and closure part, while on the other hand a polyethylene coating has been applied to the surface of the synthetic plastics film which is opposite the bottom part, so that the bottom part can combine with this coating to achieve a good adhesive connection or a sealing connection of minimal adhesive force, it is possible easily to open the completely closed package in two stages, namely the first stage of mechanical opening by raising the closure part in which only a snap fitment force has to be overcome and secondly peeling of the synthetic plastics film from the cup-shaped depression in the bottom part in order finally to open the pourer device.

The polyester film selected in the case of the special embodiment is less heat-sensitive with reference to the deep drawing process and therefore offers considerable strength vis-a-vis softening and combination with the closure part on the one hand and during the deep drawing process itself it is on the other hand not damaged and is therefore adequately capable of stretching. Thus, even after the deep drawing process, absolute sealing-tightness of the pourer device according to the invention is guaranteed particularly if this is fitted with the synthetic plastics film.

Figure 2:
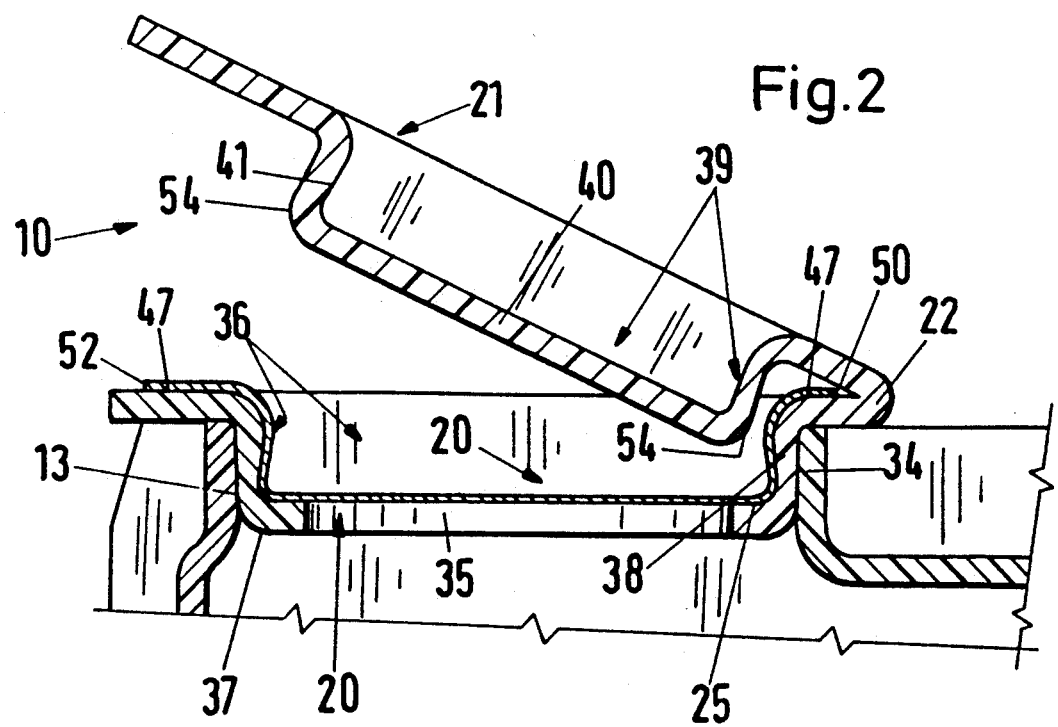
Figure 5:
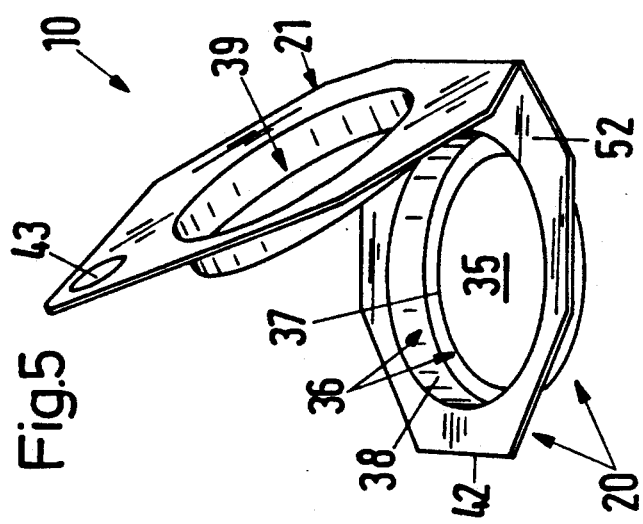
Figure 4:
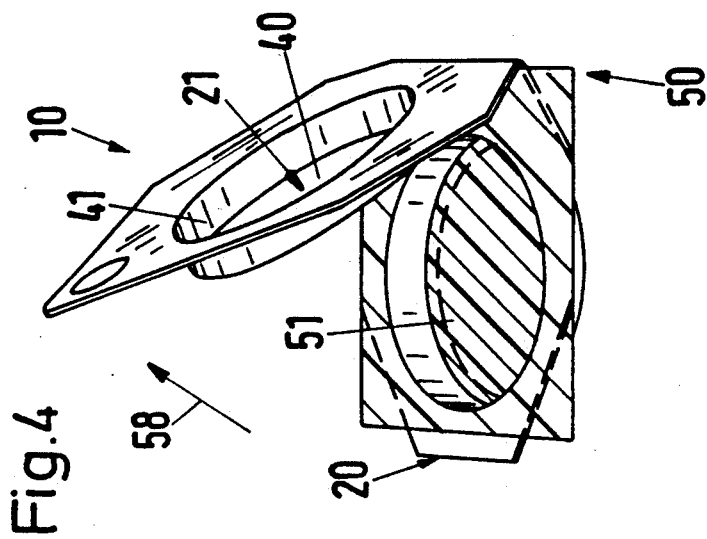
Figure 3:
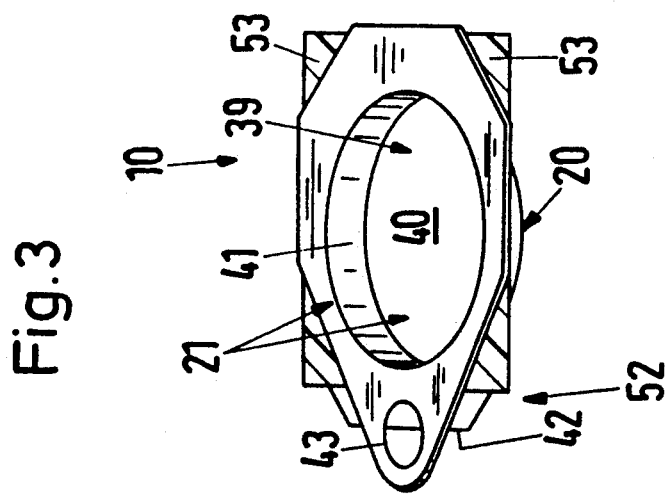
Figure 6:
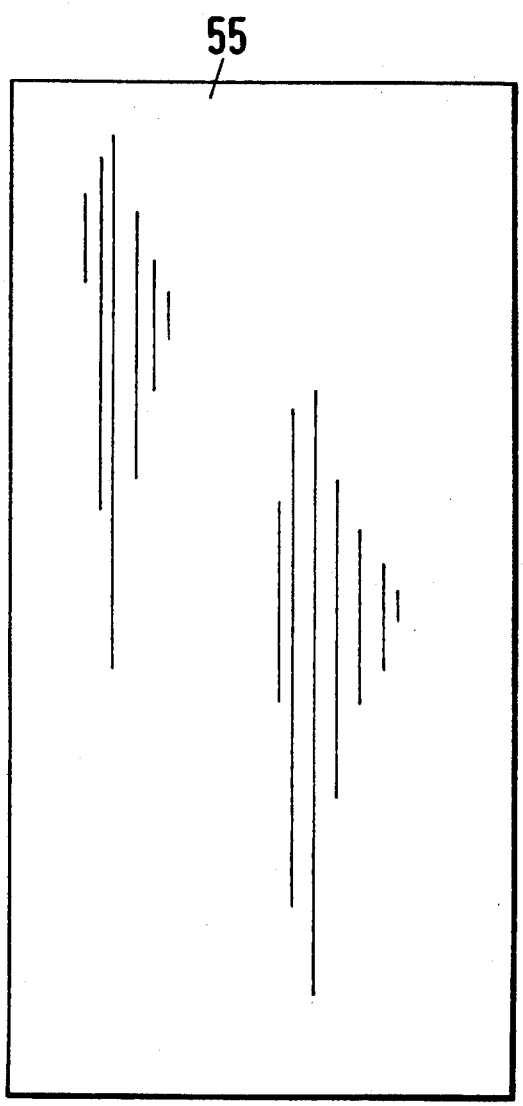
Figure 7:
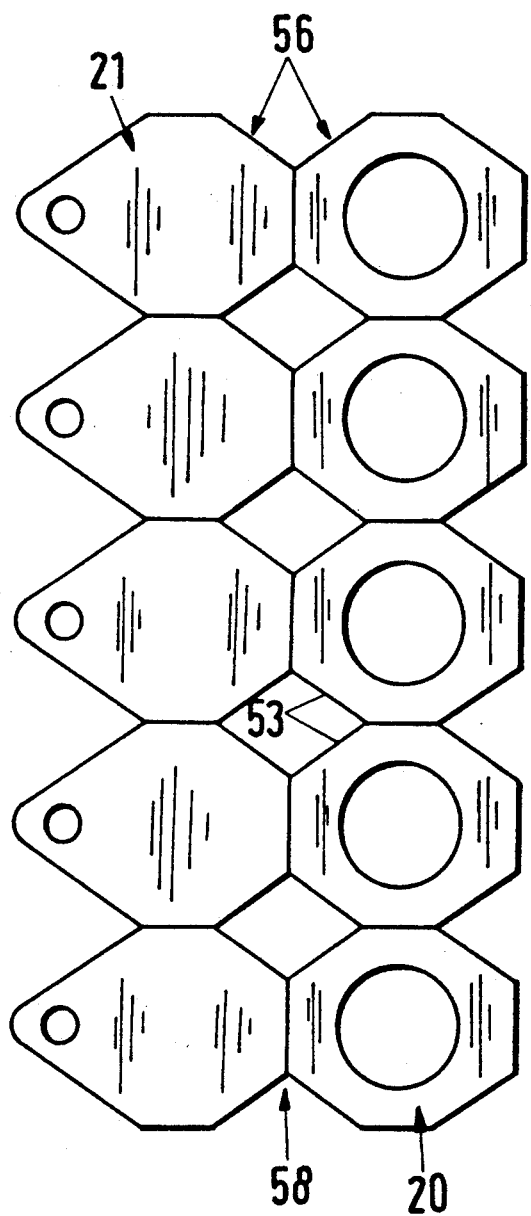

Further advantages, features and possible applications of the present invention will emerge from the ensuing description of preferred examples of embodiment in conjunction with the drawings, in which FIG. 1 is a broken-away vertical cross-sectional view of a selected embodiment of pourer device fitted on the cylindrically raised rim of the hole in a package, in the closed state, FIG. 2 is the same view as in FIG. 1 but in the opened state, FIG. 3 is a perspective view of the closed pourer device, FIG. 4 is a perspective view of the pourer device but after the closure part has been raised, FIG. 5 is a perspective view of the pourer device after the synthetic plastics film has also been removed following raising of the closure part, FIG. 6 shows in the case of a special embodiment of the production method a sheet of synthetic plastics material, e.g. polypropylene, FIG. 7 shows a series of stamped-out and still flat blanks cut from the sheet in FIG. 6, FIG. 8 shows the next stage in the process of producing the pourer device in which a synthetic plastics film has been loosely placed on the as yet not deep drawn closure parts, FIG. 9 shows that step in the production method which follows the step in FIG. 8 and in which the bottom parts provided with the stamped-out pourer orifice are folded over about the common fold line which represents the hinge, the said bottom parts still being in rod form, FIG. 10 indicates the singling out by horizontal broken lines, the bottom one of which is emphasised by an arrow, and on the left alongside the row of devices in FIG. 10 there is the same view as in FIG. 9, reproduced in order to illustrate more clearly the continuous nature of the manufacturing process, FIG. 11 is a cross-sectional view of the row of devices in FIG. 10, taken on the line XI—XI in FIG. 10, FIG. 12 is a plan view of a still not deep drawn blank which has been singled out while another embodiment of the blanks, still disposed in the row, is shown in FIG. 7 and FIG. 13 is a perspective view of the pourer device of the other embodiment such as can be obtained—with a modified pourer edge—from the blank according to FIG. 12, comparable with the view in FIG. 4 showing the first embodiment.

The pourer device shown in perspective in FIG. 3 is generally designated 10 (FIGS. 1 to 5). As illustrated in FIGS. 1 and 2, it is shown glued or sealed into the cylindrical raised rim 33 of the hole 13 in a fluids package, not shown. The gluing or sealing line along which the pourer device 10 is sealed onto the rim 33 of the hole 13 in the package is designated 34. It is ring-shaped in form because the hole 13 and also the corresponding outer contours of the pourer device 10 are circular in the case of the embodiment shown here.

The pourer device consists of the bottom part 20 and the closure part 21 which are articulatingly connected to each other, being adapted for movement about the common hinge 22.

The bottom part has a beaker-shaped depression 36 with the bottom 37 and a collar 38 which stands up around the edge thereof. Disposed in the bottom 37 is the pourer orifice 35.

Also the closure part 21 has a beaker-shaped depression 39 with a bottom 40 and a shoulder 41 rising around its cylindrical rim. Diametrically opposite the hinge 22 there is on the closure part 21 a gripper device 43 in the form of a circular hole and of which the material surrounding the hole does in the case of the folded-over closure part 21 extend somewhat beyond the bottom part 20, as can be seen from the cross-sectional view in FIG. 1 and in which in the case of the as yet not deep drawn pourer device, when viewed from below after being folded over, can be seen to the left of the end line 42 in FIGS. 9 and 10 and which finally will also constitute the pourer edge.

Another embodiment of pourer device 10 is shown in FIGS. 12 and 13 both of which are the same except that the pourer edge 42 which is still shown straight in FIG. 13 is rounded off in the case of the embodiment or the blank 56 shown in FIG. 12. Nevertheless, thereto the edge 42' which projects farthest outwards from the hinge does not project any farther outwardly than does the straight edge 42' in FIG. 13, so that the closure part 21 when in the closed state will cover the entire upper surface of the bottom part 20 as far as the pourer edge 42' or 42.

Whereas the gripper device 43 hereinabove is shaped like a circular hole, it is possible in the case of the embodiments shown in FIGS. 12 and 13, to see that the stamped-out hole is triangular so that the transverse line of the triangular hole which extends parallel with the hinge and which is remote from the point of the triangle, comes to rest substantially over or rather outside the pourer edge 42, 42' in the folded-together closed condition. Common to all the embodiments of gripper device 43 is that they consist solely of a stamped-out hole and are not formed by deep drawing or any similar process. Nevertheless, the fingers cannot slip when gripping so that the gripper device according to the invention offers increased friction for the end user.

Reference numeral 25 denotes the boundary line of the pourer orifice 35 in the bottom 37 of the beaker-shaped depression 36 in the bottom part 20.

From the line 50 which represents the inner end edge of a synthetic plastics film 51 and which is shown as a dot 50 in FIGS. 1 and 2, as far as the oppositely disposed line 52 which is the outer end edge of the synthetic plastics film 51 and which is again shown as a dot 52 in FIGS. 1 and 2, the synthetic plastics film 51 extends over the closed annular flat surface 53 disposed around the beaker-like depression 36 in the bottom part 20 in a manner such as is shown in FIGS. 3 and 4. This annular flat marginal surface 52 is therefore completely covered by the synthetic plastics film 51 so that only the pourer edge 20 is left exposed and at four locations 53 the synthetic plastics film 51 even protrudes triangularly beyond the surface of the pourer device 10.

In FIGS. 1 and 2 it is also possible to see the bead 54 provided in the bottom portion (close to the bottom 40) of the beaker-like depression in the closure part 21 and projecting outwardly at its shoulder 41 and which can engage into a corresponding annular recess not shown in greater detail through a corresponding rolled edge alongside the rim 25 of the shoulder 38 on the beaker-like depression 36 in the bottom part 20.

Production of the pourer device can best be seen from FIGS. 6 to 11. From the sheet 55 in FIG. 6, which consists of a polypropylene film, blanks 56 are produced by being stamped out of the sheet in the form of a row as shown in FIG. 7, the annular hole 43 which serves as a gripper device, the pourer orifice 35 and the square-type intermediate portions at the locations 53 have been omitted. The individual blanks have a common boundary line 57 which is shown more clearly as the cutting line 57 in FIGS. 10 and 11. Furthermore, all the blanks 56 in the row shown in FIG. 7 have a common fold line 58 which will subsequently be the hinge 22 of the relevant pourer device 10.

After the stamping process to obtain the row of blanks 56 shown in FIG. 7, during the next stage in production, the synthetic plastics film 51 is so inserted that its inner edge 50 is positioned close by the fold line 58 while its outer end edge 52 does not cover the ring holes 43 for the gripper device. The condition then reached is that shown in FIG. 8.

Then follows the folding over of the row of bottom parts 21 about the common fold line 58 to reach the situation shown in FIG. 9 from which it is clearly obvious how the interposed synthetic plastics film 51 projects at the locations 53 beyond the surfaces of both bottom part 20 and also top part 21.

The row of as yet not deep drawn pourer devices 10 in the condition shown in FIG. 9 then represents the portable intermediate product and it is wound onto a roll not shown in greater detail so that it can be fed to a package producing machine.

Now let us examine the page containing drawings FIGS. 10 and 11 on which the strip of intermediate products according to FIG. 9 is again shown repeated on the left which is an indication that the row of blanks 56 with interposed synthetic plastics film 51 is being unrolled from the roll and is fed to further processing in the package producing machine behind the filling station. This processing resides first and foremost in the deep drawing process which forms the beaker-like depressions 36 and 39 in bottom part 10 and closure part 21. The deep drawn state, i.e. the row of pourer devices which are still fastened together, is shown in FIG. 10. In cross-section along the line XI—XI in FIG. 10 the deep drawn pourer devices are shown in the form of a row, i.e., still adjacent one another, as indicated in FIG. 11.

Where another method of production is concerned, it is only then that the cut is made along the line 57 (FIGS. 10 and 11) followed by deep drawing. In any case, the state of the deep drawn pourer device 10, also when it has been singled out, is shown in plan and cross-section in FIGS. 10 and 11 and in perspective in FIG. 3. The completely shaped pourer device 10 according to FIG. 3 is now placed onto the raised rim 33 of the hole 13 in a package for holding liquids and is secured there, for instance by gluing, sealing or the like.

If one imagines the pourer device 10 shown in FIG. 3 sealed onto a fluids package, not shown, then this is the condition in which it reaches the end user.

For opening, the end user takes hold of the gripper device 43 and pulls the closure part 21 upwards in the direction of the curved arrow 58 (FIG. 4), the closure part 21 separating from the separately held synthetic plastics film 51 without the need for any particular force to be applied, because also in the case of the deep drawing process, no sealing or adhesion effect has taken place between the closure part 21 and the surface of the synthetic plastics film 51 which is opposite. This then is the situation shown in FIG. 4. It can be seen that the pourer orifice 35 is still completely and bacteriologically closed in a sealing-tight manner. From outside, a man skilled in the art will moreover have recognised from FIG. 3, from the projecting tips of the synthetic plastics film 51 at the locations 53, that the package has not yet been opened. He can therefore work on the basis that in actual fact the pourer orifice 35 is still sealed in a bacteriologically tight manner.

In order to be able to pour out the contents, the end user now takes hold of one tip of the synthetic plastics film 51 which preferably protrudes to the front alongside the pourer edge 20 and peels this away from and out of the beaker-shaped depression 36 in the bottom part 20. After removal of the synthetic plastics film 51, the situation reached is that shown in FIG. 5. The pourer orifice 35 is exposed and the process of pouring can be started.

After partial pouring out of the granular or liquid contents, the pourer device can also be easily sealed again. To do this, it is necessary only mechanically to fold the closure part 21 down again against the direction of the curved arrow 58 and it will snap into place. Certainly, the end user will immediately appreciate that for lack of projecting parts of the synthetic plastics film, e.g. at the locations 53, the package has obviously already been opened once.

It can happen that the embodiment of pourer device shown in FIGS. 1 to 11, after opening and repeated raising and depressing of the closure part 21 in respect of the bottom part 20 will display the disadvantage that for a further pouring following raising of the closure part 21 into the position shown in FIG. 5, the closure part 21 may not remain in this position but will drop.

In order also to exclude the possibility of this disadvantage and to make pouring more convenient, the retaining web 60 is according to the invention provided on the closure part 21, as shown in FIGS. 12 and 13.

The blank 56 in FIG. 12 looks very similar to that from the row of blanks in FIG. 7 except that the fold line 58 is broken in the middle so that by a U-shaped stamped-out slot, there is an interruption although the hinge function is not afterwards adversely affected. In the case of the finished closure part 21 in the embodiment according to FIG. 13, following the deep drawing stage, it is possible to see how the retaining web 60 is disposed at the height of the upper plane of the closure part 21 and extends rearwardly, i.e. projects in the direction opposite that of the gripper device 43.

The purpose of the pourer device according to the invention is that it should be mounted onto the hole of a package for fluids contents and which requires to be sealed. If, now, in the region of the hole on the package there is a web, a seam, an edge or the like of suitable height, the retaining web, when it is raised into the position shown in FIG. 13, comes into engagement with this seam, edge or other raised portion so that either a snap fitment, a clamping effect or at least a friction is so produced that the closure part 10 remains in the position shown in FIG. 13. Then, the end user is able readily to pour out the contents.

The embodiment of pourer device according to FIG. 13 does not in the region of the hinge 22 have the locations 53 mentioned above particularly in connection with FIGS. 7 and 3 and at which closure part 21 and bottom part 20 are stamped out so that parts of the synthetic plastics film extend beyond them in visible manner. Nor is this necessary, because for the opening process it is entirely adequate if the synthetic plastics film 51 projects at the front corners alongside the pourer edge 42 and can be gripped there by the end user when the package has to be opened for the first time.

Where the embodiment in FIG. 12 is concerned, however, these locations 53 are again provided by the square-shaped stamping out process, as was described hereinabove in connection with FIG. 7. The stamped out shapes 53 in FIG. 12 are however smaller than they are in the embodiment in FIG. 7. For practical purposes, only the outer edges are broken. The synthetic plastics film 51 then hardly projects at all in a visible manner. This produces an attractive appearance.

In comparison with the embodiment shown in FIG. 13, the pourer edge 42' of the embodiment of pourer device in FIG. 12 has been rounded off. This has the advantage that even when the opened package is held at an angle, the contents can pour our more satisfactorily in all directions. Furthermore, it is advantageous that by the reduction in the surface area alongside the foremost middle portion of the pourer edge 42, the end user does not when first opening the package have to grip underneath the pourer edge which might adversely affect the opening function. As a result of the rounded off new pourer edge 42', this application of a grip underneath the pourer edge becomes unnecessary so that even when handling the pourer device, the opening function cannot be adversely affected even if no special care is taken.

If one examines the intermediate product in which following the stamping process, there is placed loosely on the bottom part a synthetic plastics film onto which the closure part is placed by being folded over, then it is possible to appreciate the nature of the connection of the synthetic plastics film in this peelable manner more clearly if one remembers that the synthetic plastics film is deep drawn together with the bottom part and closure part and thereby becomes peelably connected to the bottom part on one of its surfaces. By virtue of the multi-layer structure of the synthetic plastics film 51 so that the side which faces the closure part consists of a material which during the deep drawing process does not enter into any kind of sealing or gluing combination with the closure part, while another layer of the synthetic plastics film which faces the bottom part consists of a material which can be sealed together with the bottom part, then an attempt could be made to connect the synthetic plastics film to the bottom part by a special sealing process. However, advantageously the invention does not follow this path but economises on the special sealing process in which an even only peelable connection between synthetic plastics film and bottom part with a minimal adhesive force would be difficult to achieve. Instead, according to the invention, the bottom part and the closure part are jointly deep drawn together with the inserted synthetic plastics film and only the heat or molecular displacement created during this deep drawing process produces the peel-off connection between the bottom layer of the synthetic plastics film and the closure part.

We claim:
1. A pourer device for attachment to a hole in a package intended to contain flowable contents, comprising:
   a bottom part including a pourer orifice formed therein;
   a closure part;
   a hinge connecting the bottom part and the closure part so that at least one of the bottom part and the closure part is movable between an open and a closed position; and
   a non-porous film member partially sandwiched between portions of the bottom part and the closure part, the film member covering the pourer orifice.
2. A pourer device according to claim 1, wherein the film member is sealed around the pourer orifice in the bottom part to form a barrier to bacteria.

3. A pourer device according to claim 1, wherein an outer surface of the bottom part is covered by the closure part when the bottom part and the closure part are in the closed position.

4. A pourer device according to claim 1, wherein the film member includes at least a first and a second layer, a surface of the first layer, which is adjacent the closure part, being unattached to the closure part.

5. A pourer device according to claim 1, wherein one or more edge portions of the film member extend beyond a peripheral edge of the bottom part.

6. A pourer device according to claim 1, wherein the bottom part and the closure part each are formed with a beaker-shaped depression, the beaker-shaped depressions each including a bottom portion and a shoulder portion rising from an edge of the bottom portion, wherein the beaker-shaped depression in the closure part is movable into the beaker-shaped depression in the bottom part to mask the pourer orifice.

7. A pourer device according to claim 2, further comprising a closing means formed by fitting the beaker-shaped depression in the closure part into the beaker-shaped depression in the bottom part, the outside diameters of the beaker-shaped depressions in the bottom part and in the closure part being formed so that the closure part fits into the bottom part together with the film member extending between the shoulder portions of the bottom part and the closure part.

8. A pourer device according to claim 1, wherein the film member is formed of a material adapted to be sealed to the bottom part during a deep drawing operation.

9. A pourer device according to claim 8, wherein the film member is formed of a synthetic plastic material.

10. A pourer device according to claim 1, further comprising a gripper device mounted on a portion of the closure part.

11. A pourer device according to claim 10, wherein the gripper device is mounted on the closure part diametrically opposite the hinge.

12. A pourer device according to claim 10, wherein a gripping hole is formed in a portion of the gripper device.

13. A pourer device according to claim 10, wherein the gripper device forms a portion of the closure part.

14. A pourer device according to claim 1, further comprising means for retaining the closure part in the open position.

15. A pourer device according to claim 14, wherein the retaining means includes a retaining web extending from a portion of the closure part, at least a portion of the retaining web being adapted to contact an adjacent surface to retain the closure part in an open position.

16. A pourer device according to claim 15, further comprising a member for engaging with the portion of the retaining web to retain the closure part in the open position.

* * * * *